Figure 1:
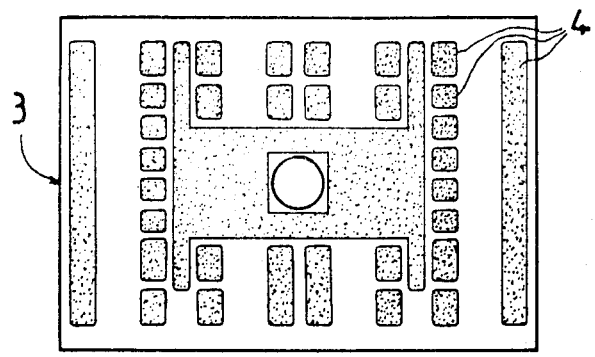

United States Patent [19]

Kaartinen et al.

[11] Patent Number: 4,766,922

[45] Date of Patent: Aug. 30, 1988

[54] PROCEDURE FOR FORMING COCKS CLOSABLE BY FREEZING, BELONGING TO A LIQUID BATCH HANDLING UNIT, AND HANDLING UNIT SET UP ACCORDING TO THE PROCEDURE

[75] Inventors: Niilo Kaartinen, Kuusisto; Henrik Johansson; Ahti Leinvuo, both of Espoo; Paul Collander, Kaunianinen, all of Finland

[73] Assignee: Fluilogic Systems Oy, Finland

[21] Appl. No.: 15,130

[22] PCT Filed: Apr. 11, 1986

[86] PCT No.: PCT/FI86/00039

§ 371 Date: Dec. 11, 1986

§ 102(e) Date: Dec. 11, 1986

[87] PCT Pub. No.: WO86/06144

PCT Pub. Date: Oct. 23, 1986

[30] Foreign Application Priority Data

Apr. 12, 1985 [FI] Finland .................. 851478

[51] Int. Cl.[4] .......................... F16K 49/00; F17D 1/18
[52] U.S. Cl. ........................ 137/13; 137/341;
137/828; 137/884; 138/33; 219/201; 219/535
[58] Field of Search ................ 219/200, 201, 535;
62/293; 165/96; 137/13, 340, 341, 828, 884;
138/33

[56] References Cited

U.S. PATENT DOCUMENTS

| | | | |
|---|---|---|---|
| 3,351,738 | 11/1967 | Kahn | 137/341 |
| 3,398,262 | 8/1968 | Kahn | 137/341 |
| 3,695,301 | 10/1972 | Pittman | 138/97 |
| 3,721,255 | 3/1973 | Suzuki et al. | 137/828 |
| 3,733,459 | 5/1973 | Lengstorf | 137/341 |
| 4,269,212 | 5/1981 | Kaartinen | 137/884 |

Primary Examiner—George L. Walton
Attorney, Agent, or Firm—Lorusso & Loud

[57] ABSTRACT

The invention concerns a procedure for forming cocks closable by freezing, belonging to a liquid batch handling unit, and a liquid handling unit set up in accordance with the procedure. The unit consists of two bodies (1,2) placed against each other, the cocks being located between their faces and one of them (2) comprising the flow passages leading to the cock points and the other body (1), which is connected to a refrigerator, being provided with electric heaters located at the cock points and with the aid of which the cocks can be opened and closed. It is essential in the invention that the cocks are created by means of depressions (11-13) which are formed in at least one of said two bodies (1,2), that in at least one of said two bodies are separately formed depressions or cavities (4,17) in which thermal lagging material is placed, that the surfaces of the bodies to be placed against each other are made of a chemically inert material so that the walls confining the cocks in the handling unit consist of liquid frozen in the interstices between the cocks and of said inert material, which encloses the thermal lagging material and the heating elements inside the bodies, and that at least on the body (1) to be connected to the refrigerator and provided with heating elements the surfaces layer of inert material is made so thin that its thermal conductivity in the region of the cocks is 0.2–100 mW/°C. mm[2]. The handling unit of the invention is appropriate for incorporation in an automatic analyzer which manipulates batches of liquid under electric control, without moving parts.

12 Claims, 3 Drawing Sheets

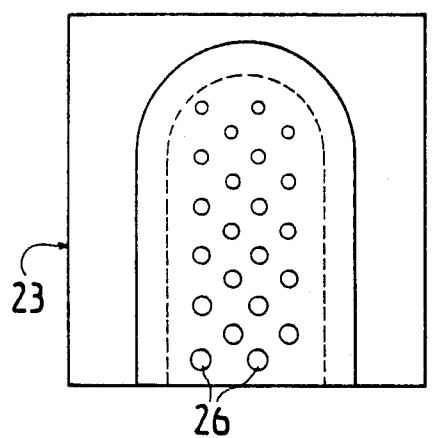
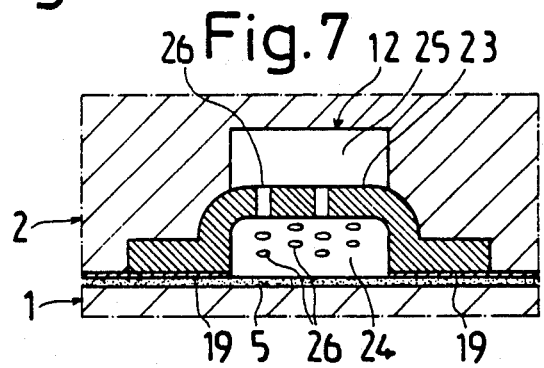
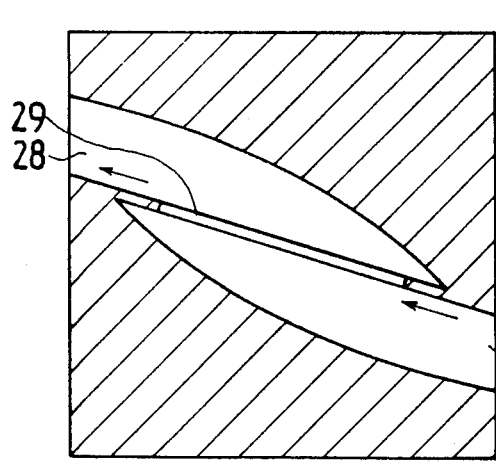
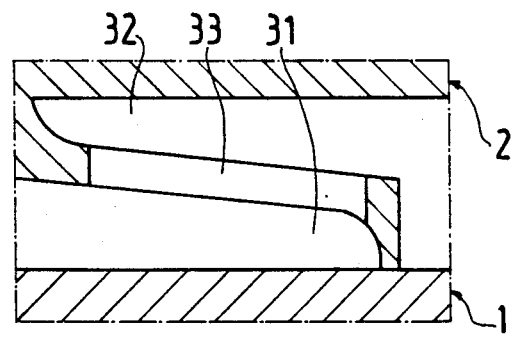
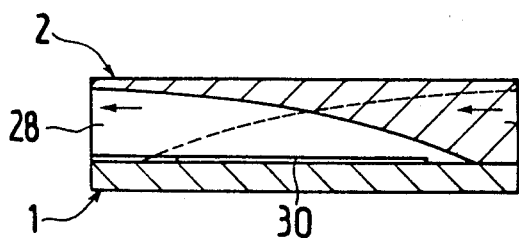
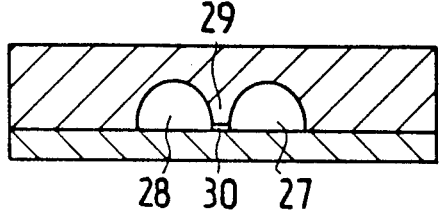

PROCEDURE FOR FORMING COCKS CLOSABLE BY FREEZING, BELONGING TO A LIQUID BATCH HANDLING UNIT, AND HANDLING UNIT SET UP ACCORDING TO THE PROCEDURE

The present invention concerns a procedure for forming cocks closable by freezing, belonging to a liquid batch handling unit, wherein the cocks are created by placing against each other two bodies in such manner that the cocks are established between the opposing faces of said bodies, one of said bodies comprising the flow passages leading to the cock points and the other body, connectable to a refrigerator, being provided with electric heating elements located at the cock points and by the aid of which the cocks can be opened and closed, and in said procedure thermal lagging material being placed in the area of the cocks for controlling their cooling and warming up, and parallel cocks being isolated from each other by allowing the gaps between them, between the faces of the bodies, to fill with liquid which freezes the gaps to be closed.

In the Finnish Pat. No. 57850 is disclosed a procedure and apparatus for handling liquid batches in which the handling takes place in a system consisting of storage or manipulation volumes and of passages connecting these, in this system each one of the passages between volumes being provided with at least one cock closable by freezing. Each cock is connected to a continuously operating refrigerator and provided with a separate electric heating element in such manner that the heating element when operating keeps the temperature of the cock above the freezing point of the liquid that is being handled, whereby the cock is open in this case, and when ceasing to operate allows the cock to freeze to be closed. The liquid handling taking place in the system, based on transferring liquid batches by the aid of differential pressure from given volumes to other volumes, is then achievable by means of electric control acting on the heating elements. The apparatus of the reference is particularly appropriate for use as an automatic analyzer in which the handling of liquid batches operates on the basis of differential pressure between the volumes and of electronic control of the heating elements, without any moving mechanical components whatsoever.

The apparatus of the Finnish Pat. No. 57850 consists of handling units of which the design is readable from FIGS. 1-6 in the reference. The unit comprises a body as shown in FIGS. 1-4, having liquid volumes serving e.g. as storage spaces, and of a plate-like matrix as shown in FIG. 5 placeable theragainst, this matrix containing electric resistances serving as heating elements. In FIG. 6 is seen a cock point belonging to the unit, which has been formed between said body and the matrix placed against it. The matrix is on the other side connected to a continuously operating refrigerator, and between the body and the matrix has been placed lagging material around the cock, this material serving as insulation between the cold refrigerator and the warm body comprising liquid volumes.

As the technology presented in the Finnish Pat. No. 57850 has been further developed into practical applications, it has been found that even though the cock design of the reference is serviceable as it is, it is still encumbered by several harmful drawbacks. First among these should be mentioned that the structure composed of a body containing liquid volumes, of a matrix containing electric resistances and of thermal lagging fixed between them by cementing and pressing is disadvantageous as a construction. This is because it is awkward work to disassemble the structure in the event that it becomes necessary to clean the cocks for relieving obstructions which may have plugged them, or if it is desired to change the construction of the handling unit. Furthermore, the liquid being handled tends to enter the gaps between the lagging and the bodies placed against it, freezing there and, as it expands, rupturing the fixations of the lagging. In addition, there is the drawback that it is not possible in the area of the cocks to elecit steep enough temperature gradients for creating the boundary surfaces between ice and liquid in the cocks exactly at the desired points with assurance, this being largely due to the unfavourable location of the thermal lagging on the sides of the cock. The somewhat indefinite freezing of the liquid in the cocks hampers the dosing which has to be performed with the handling unit: the dosage is inaccurate owing to the liquid quantity remaining between the conduit employed in the dosing operation and the cocks closing its branches and which is entrained with the doses. Furthermore, the thermal lagging material, as well as the film-like electric resistance located adjacent to the cocks, are encumbered by the drawback that their chemical resistance is poor. For instance, strong acids and alkalis handled in the system may become contaminated owing to dissolving taking place, and such dissolving at the same time corrodes the lagging and the resistances in the course of time until they become unfit for use.

The object of the present invention is to devise a problem solution of new type for the forming of cocks belonging to a liquid batch handling unit in which the above-mentioned drawbacks are avoided. The invention is characterized in that the cocks are established by means of depressions which are formed in at least one of the two above-mentioned bodies which are intended to be placed against each other; that in at least one of said two bodies are separately formed depressions or cavities in which thermal lagging material is placed; that the surfaces of the bodies which are going to be placed against each other are made of a chemically inert material so that in the completed handling unit the walls confining the cocks consist of frozen liquid and of said inert material, which encloses the thermal lagging material and the heating elements within the bodies; and that at least in the body which is going to be connected to the refrigerator and is provided with heating elements the surface layer of inert material is made so thin that its thermal conductivity is 0.2 to 100 mW/°C. mmin the region of the cocks.

The essential feature in the problem solution of the invention is "encapsulation" of the thermal laggings as well as the electric heating elements within the bodies which are placed against each other, so that a substantially completed unit is obtained simply by placing the bodies against each other. The cock points are then formed of the depressions, the intervening spaces of which are frozen to be closed, and the thermal laggings and the electric heating elements lie under the inert coating material that is used, protected against the dissolving effect of the liquids which are being handled. In the absence of any thermal lagging which would be cemented between the bodies, the handling unit is also easy to disassemble; disassembly is effected by discontinuing the operation of the refrigerator, whereby the ice between the bodies, which mutually isolates the parallel cocks, melts, and the bodies become detached.

Servicing the unit, or modifying it by replacing one body or the other is therefore conveniently accomplished.

The embedding of the thermal laggings, adjacent to the cock, within one body or both further affords the chance to place the laggings more favourably than before in view of the temperature gradients which have to be created. The principle in placing the laggings is that efficient heat transfer is provided between the central region of the cock and the refrigerator, while the margins of the cock are preferably insulated on the side of the refrigerator so that the limit of the frozen area can be made to coincide with great accuracy with the desired location. The accuracy of this limit may furthermore be enhanced by means of appropriate shaping of the cock's margins, for instance by making the marginal areas of the cock conically widening towards the centre of the cock.

The inert surface layer of the body provided with heating elements is made thin for the reason that it should not constitute a barrier to the conduction of heat between the cock and the refrigerator, nor should it transport heat in lateral direction, by which achieving the desired step temperature gradients on the margins of the cock would be prevented. This is achieved in a thin enough layer, independent of whether the inert material is a good or poor thermal conductor in itself. An example of the former are noble metals and of the latter, fluoropolymers, all of them usable in the invention. Fluoropolymers are then placed at the lower end, and noble metals at the top end, of the thermal conductivity range cited, i.e., 0.2 to 100 mW/°C. mm$^2$.

One embodiment of the invention is characterized in that the depressions required for creating cocks are made in that body which contains the flow passages leading to the cocks, and that in both bodies separately depressions are made which are filled with thermal lagging material. The first-mentioned depressions may in that case be formed by casting on the side of the body a layer of chemically inert material in such manner that the depressions will be formed in connection with the casting process, and at the same time the material being poured envelops under itself the depressions which have been formed at the cock locations and filled with thermal lagging material, in an earlier step.

According to another embodiment of the invention, the body meant to be connected to a refrigerator and which is provided with heating elements is constructed by forming, at first, a metallic part in which are made depressions which are filled with thermal lagging material and substantially film-like part in which to a plastic or glass fibre film are joined electric resistances to serve as heating elements and which is coated with a thin layer of chemically inert material, and by thereafter joining together these two parts so that the inert material will be the superficial layer of the body. In the problem solution, the said plastic or glass fibre film may be considered a replacement for the ceramic matrix plate, e.g. of aluminium oxide, of the Finnish Pat. No. 57850, this replacement having the advantage that it can be made rather much thinner and more permeable to heat. The abrupt stopping of the liquid flow arriving at a frozen cock, which is one of the basic functions of the handling unit, will then take place with far greater assurance and efficiency than before.

For equilisation of the heating effect of the electric heating elements, said film-like component belonging to the body which will be connected to the refrigerator may be provided with metallic thermal equalizing plates adjacent to the resistances. These plates will transport and equalize the heat in lateral direction, on one hand in the central areas of the cocks and on the other hand in the regions of the cock margins and of the passages connecting with them. In said areas a major temperature difference is desirable between closely adjacent cold and warm areas.

The invention also concerns a unit for handling liquid batches constructed in accordance with the procedure just described and containing cocks closable by freezing. The unit is consistent with that which is known in the art through the Finnish Pat. No. 57850 in the respect that it consists of two bodies placed against each other, between the faces of which the cocks are located and of which one comprises the flow passages leading to the cocks and the other (the body connected to a refrigerator) has been provided with electric heating elements located at the cock points, the cocks being openable and closable with their aid, and that in the region of the cocks has been placed thermal lagging material for controlling their cooling and warming up, and parallel cocks have been isolated from each other by means of frozen liquid filling the gaps between them. The handling unit of the invention is characterized in that the cocks consist of depressions, provided in at least one of the two opposing surfaces of said bodies; that the opposed surfaces of the bodies are made of chemically inert material, whereby the walls confining the cocks consist of said inert material and of frozen liquid; that at least in the body connected to the refrigerator and provided with heating elements the surface layer of inert material covering the heating elements is so thin that its thermal conductivity in the region of the cocks is 0.2-100 mW/°C. mm$^2$; and that thermal lagging material has been placed in cavities covered by the layer of inert material, located in at least one of said bodies.

The rapid stopping of the liquid flow arriving at a frozen cock may be further enhanced by providing the cock with an inert stopping member which is installed in the depression forming the cock in such manner that it divides the cock in the direction of flow of the liquid into two parts which communicate through one or several capillary gaps and which have been so shaped that the surface tension which is active in the gaps, and the rapid freezing of the liquid, stop the flow arriving at the cock in that part which is first in the direction of flow. The stopping member is preferably a body of material with good thermal conductivity, e.g. copper, which has been coated with a noble metal, e.g. gold. It is easy to place a body like this in the depression formed for the cock, before the bodies forming the handling unit are placed against each other.

Figure 2:
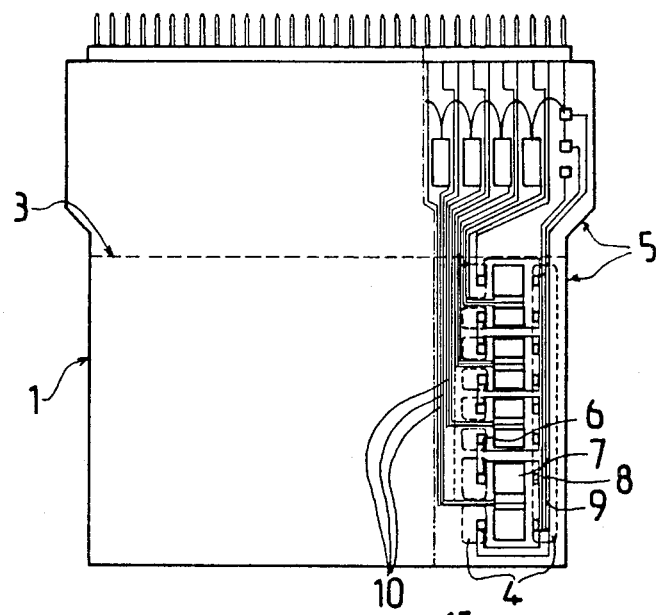
Figure 3:
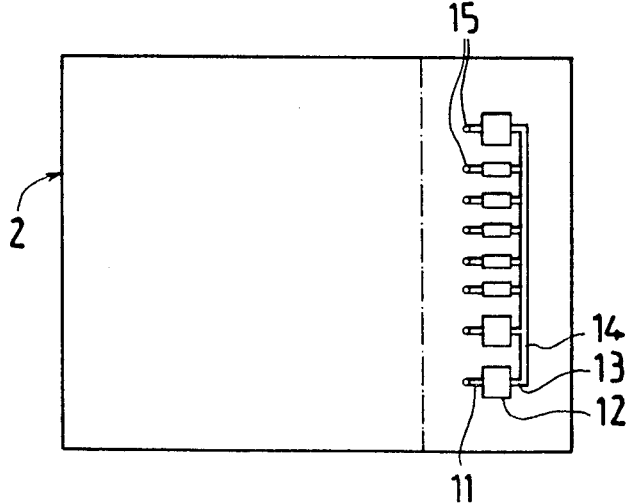
Figure 4:
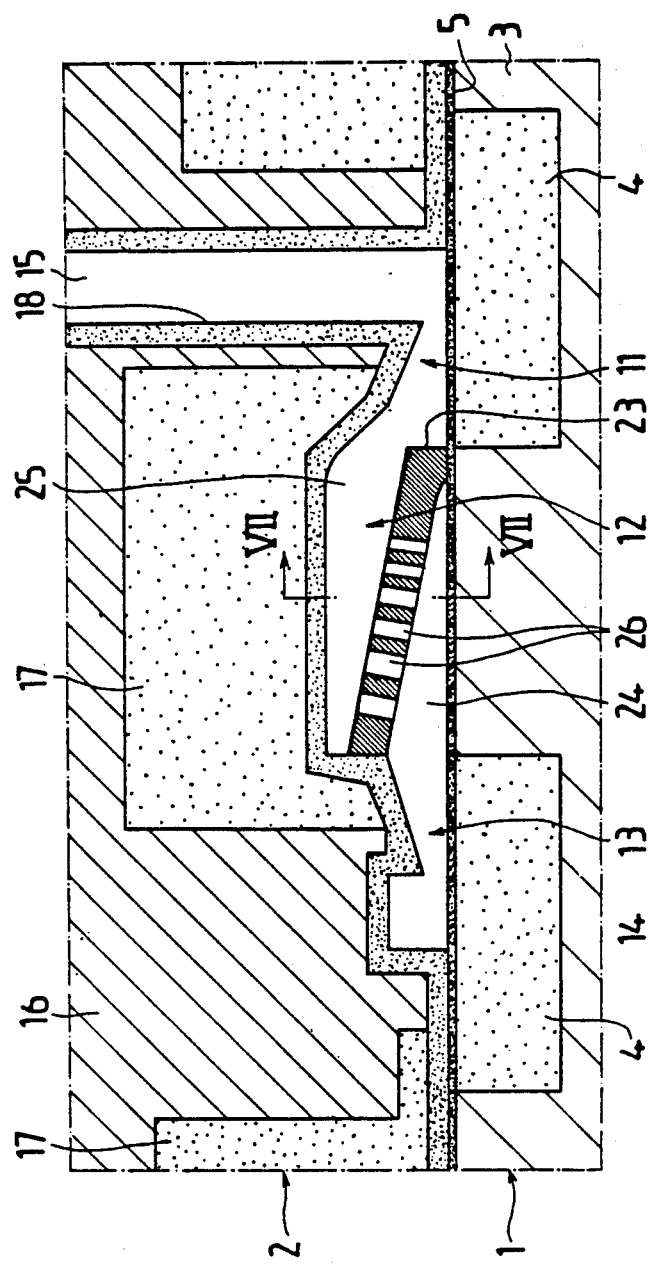
Figure 5:
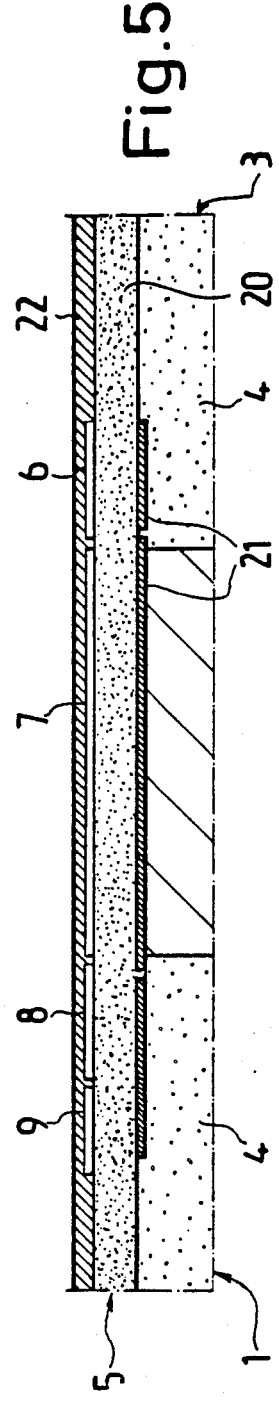

The invention is described in the following in greater detail with the aid of examples, referring to the attached drawings, wherein:

FIG. 1 presents a metallic part with depressions filled with thermal lagging material, FIG. 2 presents a body which has been formed by fixing over a metallic part as in FIG. 1, a film-like part comprising electric resistances (only part of the resistances and of the leads connecting therewith being depicted), FIG. 3 presents a body in the surface of which have been formed depressions for producing cocks and flow passages leading thereto and which is intended to be placed against the body of FIG. 2 (only part of the depressions being depicted), FIG. 4 presents a cock point that has come into being between the bodies of FIGS. 2 and 3, provided with a separate stopping member, FIG. 5 presents on enlarged scale, the surface of the body of FIG. 2 in the region of a cock, FIG. 6 presents the stopping member used in the cock of FIG. 4, in top view, FIG. 7 presents the stopping member, placed in a cock, representing the section VII—VII in FIG. 4, FIG. 8 presents an alternative stopping member for use in a cock, seen from the direction of the body provided with heating elements, FIGS. 9 and 10 present longitudinal and transversal sections of the stopping member of FIG. 8, placed in a cock; and FIG. 11 presents another alternative stopping member, placed in a cock.

The liquid batch handling unit, belonging to an analyzer intended for analysing small liquid batches, is formed, as taught by the invention, of two bodies 1 and 2 to be placed against each other, these bodies being depicted in FIGS. 2 and 3. The body 1 of FIG. 2 is composed of two parts, one of them consisting of the metallic part 3 shown in FIG. 1. The part 3 consists, preferably, of a comparatively thick aluminium plate in which depressions 4 have been formed, which have been filled with thermal lagging material, for instance with cast or machined foamed plastic, which may be a PVC/nylon-based plastic or polyurethane. In the body 1, a film-like part 5 has been fixed over the metallic part 3, this film-like part comprising electric resistances 6–9 and the leads 10 connecting therewith. In FIG. 2, where the metallic part 3 and the film-like part 5 are depicted as fixed to each other, the depressions 4, filled with thermal lagging material, in the underlying metallic part and the metallic edge lying under the film have been indicated with interrupted lines. The design of the film-like part 5 shall be described more closely later on, in connection with FIG. 5. The other body of the handling unit, 2, presented in FIG. 3, comprises depressions 11–14 formed in the surface of the body, these depressions serving the purpose of forming the cock points, closable by freezing, of the unit as well as parts of the passages interconnecting these. Part of the passages run through the body 2, and in FIG. 3 can be seen several ends of such passages, bearing the reference numeral 15. The design of the body 2 shall be more closely descibed later on, referring to FIG. 4.

One may note, on comparison of FIGS. 2 and 3, that when the bodies 1 and 2 are placed against each other the cocks are created between the bodies in such manner that the resistances 7 come to lie in register with the central areas 12 of the cocks, the resistances 6 and 8 at the margins 11 and 13 of the cocks, and resistance 9 in register with the passage 14 interconnecting the cocks. The resistances are mostly provided with individual leads 10 so that they can be operated independent of each other. Thus it becomes possible, for instance, that the resistance 7 over the central area 12 of a given cock has been switched to carry no current while at the same time the resistances 6 and 8 over the margins 11 and 13 of the same cock as well as the resistance 9 over the connecting passage 14 of the cocks are in operation.

It is further noted in FIGS. 2 and 3 that electric resistances, and leads connecting therewith, have been provided on the whole area of the body 1, as well as depressions over the whole area of the body 2, in such manner that the locations of the resistances and depressions conform to the locations of thermal lagging material in the metallic part 3 of FIG. 1. Part of the resistances, leads and depressions have been omitted, merely in order to simplify the figures.

The design of the cock created between the bodies 1,2 of FIGS. 2 and 3 is illustrated in FIG. 4. In the figure can be seen the metallic part 3 belonging to the body 1, with the cavities 4, filled with thermal lagging material, formed therein and with the film-like part 5 upon the metallic part, the latter's design being shown in FIG. 5. Likewise in FIG. 4 can be seen that the body 2 comprises a metallic base 16 in which depressions or cavities 17 have been formed, which have been filled with thermal lagging material (the same lagging material as in the body 1), and passages 15 for carrying the liquid to be handled through the body and to the cock points. The surface of the body 2 is coated, throughout, with a cast, chemically inert material layer 18, which consists of fluoropolymer, such as Teflon for instance, or e.g. of a suitable inert polyethylene type. The cock point and the passage on one side thereof, interconnecting parallel cocks, are formed by the depressions 11–14 in the surface of the body 2, these depressions having been shaped, to obtain their final configuration, in connection with pouring on the material layer 18.

When the handling unit is in operation, the body 1 is constantly connected to an operative refrigerator (not depicted). The refrigerator cools the cock point through the metallic part 3, and the placement of the cavities 4 filled with thermal lagging material aims at concentrating the strongest cooling effect on the central part 12 of the cock. The same purpose is served by the cavity 17, filled with thermal lagging material, provided in the body 2 behind the cock point. The body 2 may be provided with electric resistances serving as heating elements (not depicted), which through the metallic body 16 heat the cock, particularly in its marginal regions. It is achieved by this arrangement that particularly on the margins 11,13 of the cock a powerful temperature gradient can be created, whereby the passages 14,15 can be kept open while at the same time the cock is frozen to be closed.

When the bodies 1 and 2 have been placed against each other as shown in FIG. 4 and the body 1 has been connected to the refrigerator, the handling unit can be made operative by admitting liquid into the cocks and passages, this liquid spreading into all the gaps remaining between the surfaces of the bodies, and the gaps will freeze up. The passages and cock points, however, can be kept open by the aid of the electric resistances belonging to the unit. In this manner all the gaps between mutually adjacent cocks will be closed and the cocks will be efficiently isolated from each other. The ice layer serving as isolation between cocks can be seen, indicated with reference numeral 19, in FIG. 7, presenting the cross section of the cock. FIG. 7 shall be more closely discussed later on.

The design, at the cock point, of the film-like part 5 constituting the surface layer of the body 1 connected to a refrigerator and provided with electric resistances 6–9 serving as heating elements is seen in FIG. 5. The frame of the part 5, serving to hold the part together before it is attached to the metallic part 3, consists of a film 20 of plastic, such as polyamide or glass fibre-reinfoced epoxide, upon which the resistances 6–9 have been placed. Under the film 20, in register with the resistances, have been placed thermal equalizing plates 21, preferably of copper, which equalize the heating effect of the resistances. The film-like part 5 has been coated with a thin (thickness about 25 μm) inert material layer 22. The layer 22 thereby constitutes the surface of the whole body 1, and it is most properly of the same material as the above-mentioned inert surface layer 18 of the body 2.

When it is desired to stop the liquid flow dynamically by freezing the liquid immediately as it has arrived at the cock, the cock is cooled in advance by deenergizing the electric resistance adjacent to it. In order to enhance the stopping effect, the cock of FIG. 4 is provided with a particular stopping member 23 placed in the depression 12 constituting the central region of the cock. The stopping member 23 is a body made of material with good thermal conductivity, such as copper, and coated with gold or another equivalent inert material, and it has been placed in the depression 12 prior to putting the bodies 1 and 2 together. The stopping member 23 is depicted in top view in FIG. 6 and in section in FIG. 7, where the cross section of the whole central region of the cock can be seen. The stopping member 23 divides, as shown in FIG. 4, the cock into two parts 24,25 in the direction of liquid flow, these parts communicating with each other through capillary gaps 26 in the stopping member. The diameter of the capillary gaps 26 diminishes in the direction of flow towards the cavity defined by the stopping member 23 and constituting the said first part 24 of the cock and where the liquid flow arriving in the cock will stop.

The operation of the stopping member 23 is partly based on the surface tension acting in the capillary gaps 26, which prevents the liquid arriving at these gaps from traversing them immediately, and partly on the cooling of the stopping member performed in advance, by effect of which the liquid begins to freeze at once, having no time to discharge from the gaps through the stopping member into the part 25 of the cock. The freezing of the liquid arriving thereafter in the cock continues, progressing to the marginal part 13 of the cock, where the boundary surface between ice and liquid becomes established substantially at the boundary between the marginal part and the passage 14.

The handling unit just described is meant for the handling of very small liquid batches, and therefore the bodies belonging to the unit, and in particular the passages and cocks formed by them, are also rather small. The typical diameter of the passages is on the order of about 1 mm, and the breadth of the depressions formed for the cocks is typically about 1-5 mm. Thus the stopping member to be placed in the depression has a breadth on the same order, and the diameter of the capillary gaps which are part of the stopping member is on the order of about 100-200 μm. As has been mentioned before, the thickness of the inert layer 22 covering the body 1 provided with electric resistances is about 25 μm, and the thickness of the polyamide or equivalent film thereunder is about 25-50 μm.

In FIGS. 8-10 is presented an alternative embodiment of the stopping member 23, which consists of parallel passages 27,28 shaped in metal coated with inert material, the ridge 29 between them having been left open on top so that it constitutes between the passages a shallow, elongated capillary gap 30. The height of the gap 30 is about 70-100 μm at the beginning of the gap, and the gap becomes shallower in the direction of liquid flow so that its height at the opposite end is about 20-30 μm. The direction of the liquid flow has been indicated with arrows in FIGS. 8 and 9. Functionally, the stopping member of FIGS. 8-10 is substantially equivalent to that which is shown in FIGS. 4, 6 and 7.

The stopping member of FIG. 11 comprises two passages 31,32 one above the other, which communicate by a narrow capillary gap 33. This stopping member, too, is functionally consistent with what has been presented above.

It is obvious to a person skilled in the art that different embodiments of the invention are not confined to the examples presented in the foregoing and that they may vary within the scope of the claims following below.

We claim:

1. Procedure for providng valves for a liquid batch handling unit with the use of two blocks having surfaces which define the valves at predetermined valve areas as the surfaces are brought against each other, the procedure comprising the steps of providing two blocks having valve areas at their surfaces, a first block and a second block, said first block with flow passages leading to valve areas at the surface of said first block;

connecting the second block to a permanently operable refrigerator and providing electric heating elements to register with valve areas of its surface;

providing cavities in at least one of said two blocks in the vicinity of the valve areas of its surface and filling the cavities as formed with thermal lagging material;

providing depressions to the surface of at least one of said two blocks at its valve areas;

providing the surfaces of the two blocks which define the valves with a layer of a chemically inert material so that the electric heating elements and the thermal lagging material are covered by said inert material, at least the block which is connected to the refrigerator and is provided with the heating elements having the inert material layer at its valve areas so thin as to have a thermal conductivity in the range of 0.2-100 mV/°C. mm$^2$;

placing the block surfaces against each other so that the respective valve areas at the opposite surfaces will mate with each other; and conducting a liquid between the surfaces;

so that any gaps between the different valves as providing are filled with said liquid and closed permanently by freezing the liquid by means of the refrigerator, the valves being then constituted by said depressions providing valve chambers between the opposite surfaces, the valves being connected to said flow passages and defined by the inert material layers covering said surfaces and the permanently frozen liquid as present between said surfaces, and the valves being controllable by means of the electric heating elements which, when in operation, keep the respective valves open for a flow conducted through said flow passages and, when out of operation, let the refrigerator close the valves by freezing the liquid as conducted to or present in the valve chamber.

2. Procedure according to claim 1, wherein cavities are providing on both of said two blocks and filled with thermal lagging material, and depressions which make up the valve chambers are formed to the block which is provided with the flow passages.

3. Procedure according to claim 2, wherein cavities are providing to the block which is provided with the flow passages, said cavities being then filled with thermal lagging material and covered with a layer of chemically inert material so that the depressions making up the valve chambers are formed upon the filled cavities and given their final shape at the step of casting the inert material layer.

4. Procedure according to claim 1, wherein the block which is connected to a refrigerator and provided with electric heating elements is prepared by providing cavities to a basic metal block, filling the cavities with thermal lagging material, providing a substantially film-like part of a material selected from plastic and glass fiber film materials and providing it with electric resistances serving as electric heating elements, coating said film-like part with a thin layer of chemically inert material, and applying said film-like part onto the metal block so that said inert material layer will constitute the surface layer of the block.

5. In a liquid batch handling unit a flow control construction comprising:

two blocks, each of said two blocks having a surface lying against a surface of the other of said two blocks so that between the surfaces there is defined a plurality of valves at valve areas of the surfaces, the valves being constituted by valve chambers formed as depressions in the surface of at least one of said two blocks, one of said two blocks being provided with flow passages leading to the valves and the other of said two blocks being connected to a permanently operated refrigerator and provided with electric heating elements adjacent to each of the valves, and at least one of said two blocks having cavities in the vicinity of the valves, said cavities being filled with thermal lagging material, and the surfaces of the blocks defining the valves being provided with a layer of a chemically inert material so that the electrical heating elements and the thermal lagging material are covered by said inert material, at least the block which is connected to the refrigerator and is provided with the heating elements having the inert material layer at its valve areas so thin as to have a thermal conductivity in the range of 0.2–100 mV/°C. mm$^2$, and the gaps between the surfaces outside of the valve areas being filled with a permanently frozen liquid so that the valve chambers are defined by the inert material layers and the frozen liquid as present between the surfaces, the valves being controllable by means of the electric heating elements which, when in operation, are capable of keeping the respective valves open for a flow as conducted through said flow passages and, when out of operation, let the liquid as conducted to or present in the respective valve chambers freeze and thereby close the valves.

6. A flow control construction according to claim 5, wherein the depressions making up the valve chambers are providing in the block which is provided with the flow passages and both of said two blocks comprise cavities filled with thermal lagging material and a covering layer of a chemically inert material.

7. A flow control construction according to claim 5, wherein the block which is connected to refrigerator and provided with electric heating elements consists of a basic metal block which comprises cavities filled with thermal lagging material, and a substantially film-like part of a material selected from plastic and glass fiber film materials, said part being provided with electric resistances serving as electric heating elements and coated with a thin layer of chemically inert material, the film-like part being applied onto the metal block so that said inert material layer forms the surface layer of the block.

8. A flow control construction according to claim 7, wherein said film-like part comprises metallic thermal equalizing plates which have been placed in register with the resistances.

9. A flow control construction according to claim 5, wherein the thermal lagging material is cast foamed plastic material.

10. A flow control construction according to claim 9, wherein the thermal lagging material is selected from the group consisting of PVC/nylon-based and polyurethane plastics.

11. A flow control construction according to claim 5, wherein the chemically inert material is selected from the group consisting of fluoropolymers, noble metals and combinations of a fluoropolymer and a noble metal.

12. A flow control construction according to claim 5, wherein the valve chamber in at least one of the valves is provided with an inert stopping member which has been installed in the depression forming the chamber in such manner that it divides the chamber in the direction of liquid flow into two parts which communicate with each other through one or several capillary gaps and which have been so shaped that the surface tension acting in the gaps and the rapid freezing of the liquid stop the flow arriving at the valve, in that part of the chamber which is first in the direction of flow.

* * * * *